(12) United States Patent
Ford et al.

(10) Patent No.: US 11,698,180 B2
(45) Date of Patent: Jul. 11, 2023

(54) VEHICLE EXTERIOR LIGHTING SYSTEMS WITH REVEALABLE FASCIA LAMP ASSEMBLIES

(71) Applicant: FORD GLOBAL TECHNOLOGIES, LLC, Dearborn, MI (US)

(72) Inventors: Scott Aaron Ford, Coral Gables, FL (US); Aaron Bradley Johnson, Allen Park, MI (US); Paul Kenneth Dellock, Northville, MI (US); Stuart C. Salter, White Lake, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 17/408,710

(22) Filed: Aug. 23, 2021

(65) Prior Publication Data

US 2023/0055549 A1    Feb. 23, 2023

(51) Int. Cl.
| | |
|---|---|
| *F21S 43/50* | (2018.01) |
| *F21S 43/14* | (2018.01) |
| *F21S 43/20* | (2018.01) |
| *B60Q 1/50* | (2006.01) |
| *B60Q 1/00* | (2006.01) |
| *B60Q 1/28* | (2006.01) |
| *F21Y 115/10* | (2016.01) |
| *F21W 107/10* | (2018.01) |

(52) U.S. Cl.
CPC ............ *F21S 43/50* (2018.01); *B60Q 1/0023* (2013.01); *B60Q 1/28* (2013.01); *B60Q 1/50* (2013.01); *F21S 43/14* (2018.01); *F21S 43/26* (2018.01); *F21W 2107/10* (2018.01); *F21Y 2115/10* (2016.08)

(58) Field of Classification Search
CPC . F21S 43/50; F21S 43/14; F21S 43/26; B60Q 1/0023; B60Q 1/28; B60Q 1/50
USPC .......................................................... 362/459
See application file for complete search history.

(56) References Cited

U.S. PATENT DOCUMENTS

| | | | | |
|---|---|---|---|---|
| 4,872,745 | A * | 10/1989 | Fujisawa | B60Q 1/04 359/267 |
| 5,517,389 | A * | 5/1996 | Myers | F21V 9/40 362/318 |
| 5,803,579 | A * | 9/1998 | Turnbull | B60L 3/0023 362/800 |
| 5,806,957 | A * | 9/1998 | Prior | G09F 21/04 362/267 |
| 6,331,068 | B1 | 12/2001 | Chase | |
| 9,128,344 | B2 | 9/2015 | Chen | |
| 10,137,831 | B1 * | 11/2018 | Salter | H01B 3/04 |
| 10,310,298 | B2 | 6/2019 | Wang et al. | |

(Continued)

FOREIGN PATENT DOCUMENTS

KR    100534315 B1    12/2005

*Primary Examiner* — Bryon T Gyllstrom
(74) *Attorney, Agent, or Firm* — Vichit Chea; Carlson, Gaskey & Olds, P.C.

(57) ABSTRACT

Vehicle exterior lighting systems may be equipped with fascia mounted lamp assemblies. The proposed systems are capable of controlling a fascia lamp assembly to reveal the lamp assembly within the vehicle fascia and then produce various lighting effects based on sensed vehicle conditions. Exemplary fascia lamp assemblies may include a conductive lens that can be charged in order to reveal the lamp assembly within the vehicle fascia.

20 Claims, 3 Drawing Sheets

(56) References Cited

U.S. PATENT DOCUMENTS

| | | | |
|---|---|---|---|
| 11,283,163 B2* | 3/2022 | Thoday | B60R 16/0231 |
| 2006/0112801 A1 | 6/2006 | Ganci | |
| 2014/0185310 A1* | 7/2014 | Lisowski | B60R 1/1207 |
| | | | 362/516 |
| 2014/0376076 A1* | 12/2014 | Chen | F21S 41/645 |
| | | | 359/275 |
| 2019/0326908 A1* | 10/2019 | Salter | B60R 13/0243 |
| 2020/0003389 A1* | 1/2020 | Ho | F21S 43/26 |
| 2021/0190284 A1* | 6/2021 | Paroni | F21S 41/36 |

\* cited by examiner

VEHICLE EXTERIOR LIGHTING SYSTEMS WITH REVEALABLE FASCIA LAMP ASSEMBLIES

TECHNICAL FIELD

This disclosure relates generally to vehicle exterior lighting systems, and more particularly to vehicle exterior lighting systems that include fascia mounted revealable lamp assemblies.

BACKGROUND

Vehicle exterior lighting systems include a multitude of lighting and signaling devices for illuminating the vehicle and alerting others to the vehicle's presence and driving intentions. These lighting systems typically include lamp assemblies positioned at both the front and the rear of the vehicle. Some lighting systems include fascia mounted lamp assemblies.

SUMMARY

A vehicle exterior lighting system according to an exemplary aspect of the present disclosure includes, among other things, a fascia and a fascia lamp assembly that is revealable within the fascia. The fascia lamp assembly may be transitioned between an inactive state in which the fascia lamp assembly is disguised from view within the fascia and an active state in which the fascia lamp assembly is revealed within the fascia.

In a further non-limiting embodiment of the foregoing system, the fascia lamp assembly matches a color of the fascia when in the inactive state.

In a further non-limiting embodiment of either of the foregoing systems, the fascia lamp assembly includes a power source and a conductive inner lens.

In a further non-limiting embodiment of any of the foregoing systems, the power source is configured to apply an electrical charge to the conductive inner lens for transitioning the fascia lamp assembly from the inactive state to the active state.

In a further non-limiting embodiment of any of the foregoing systems, the conductive inner lens is configured to convert from a first color to clear in response to receiving the electrical charge.

In a further non-limiting embodiment of any of the foregoing systems, the fascia lamp assembly includes a lighting module that includes a plurality of light emitting diodes (LEDs) that are controllable for providing various lighting effects.

In a further non-limiting embodiment of any of the foregoing systems, the fascia lamp assembly includes an outer lens that includes a lens body and an outer rim.

In a further non-limiting embodiment of any of the foregoing systems, the outer rim facilitates connection of the outer lens to the fascia such that the lens body is positioned flush to the fascia.

In a further non-limiting embodiment of any of the foregoing systems, an illumination control module is programmed to control the fascia lamp assembly between the active state and the inactive state in response to receiving signals from a sensor system indicative of a vehicle condition.

In a further non-limiting embodiment of any of the foregoing systems, the illumination control module is further programmed to command a lighting module of the fascia lamp assembly to provide a specific lighting function adapted for visually indicating the vehicle condition.

A vehicle according to another exemplary aspect of the present disclosure includes, among other things, a fascia and a fascia lamp assembly that is revealable within the fascia. The fascia lamp assembly includes an outer lens that is positioned flush to the fascia.

In a further non-limiting embodiment of the foregoing vehicle, the vehicle includes a control module programmed to command the fascia lamp assembly between an inactive state and an active state. In the inactive state, the fascia lamp assembly is disguised from view within the fascia. In the active state, the fascia lamp assembly is revealed within the fascia.

In a further non-limiting embodiment of either of the foregoing vehicles, the control module is further programmed to command that an electrical charge be applied to a conductive inner lens of the fascia lamp assembly for transitioning the fascia lamp assembly from the inactive state to the active state.

In a further non-limiting embodiment of any of the foregoing vehicles, the conductive inner lens is configured to convert from a first color to a second color in response to receiving the electrical charge.

In a further non-limiting embodiment of any of the foregoing vehicles, the first color matches a color of the fascia and the second color is clear.

In a further non-limiting embodiment of any of the foregoing vehicles, the control module is further programmed to command a lighting module of the fascia lamp assembly to provide a specific lighting function adapted for visually indicating a sensed vehicle condition.

In a further non-limiting embodiment of any of the foregoing vehicles, the lighting function includes at least one of a parking light effect, a sidemarker lighting effect, an autonomous lighting effect, a hazard marker lighting effect, a greeting lighting effect, or a farewell lighting effect.

In a further non-limiting embodiment of any of the foregoing vehicles, the outer lens is a two-shot molded outer lens that includes a lens body and an outer rim.

In a further non-limiting embodiment of any of the foregoing vehicles, the outer rim facilitates connection of the outer lens to the fascia such that the lens body is positioned flush to the fascia.

In a further non-limiting embodiment of any of the foregoing vehicles, the fascia is comprised of a thermoplastic polyolefin (TPO), the lens body is comprised of an acrylic material, and the outer rim is comprised of a thermoplastic polyurethane (TPU).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to vehicle exterior lighting systems for vehicles equipped with fascia mounted lamp assemblies. The proposed systems are capable of controlling a fascia lamp assembly to reveal the lamp assembly within the vehicle fascia and then produce various lighting effects based on sensed vehicle conditions. Exemplary fascia lamp assemblies may include a conductive lens that can be charged in order to reveal the lamp assembly within the vehicle fascia. These and other features of this disclosure are described in greater detail in the following paragraphs of this detailed description.

Figure 1:
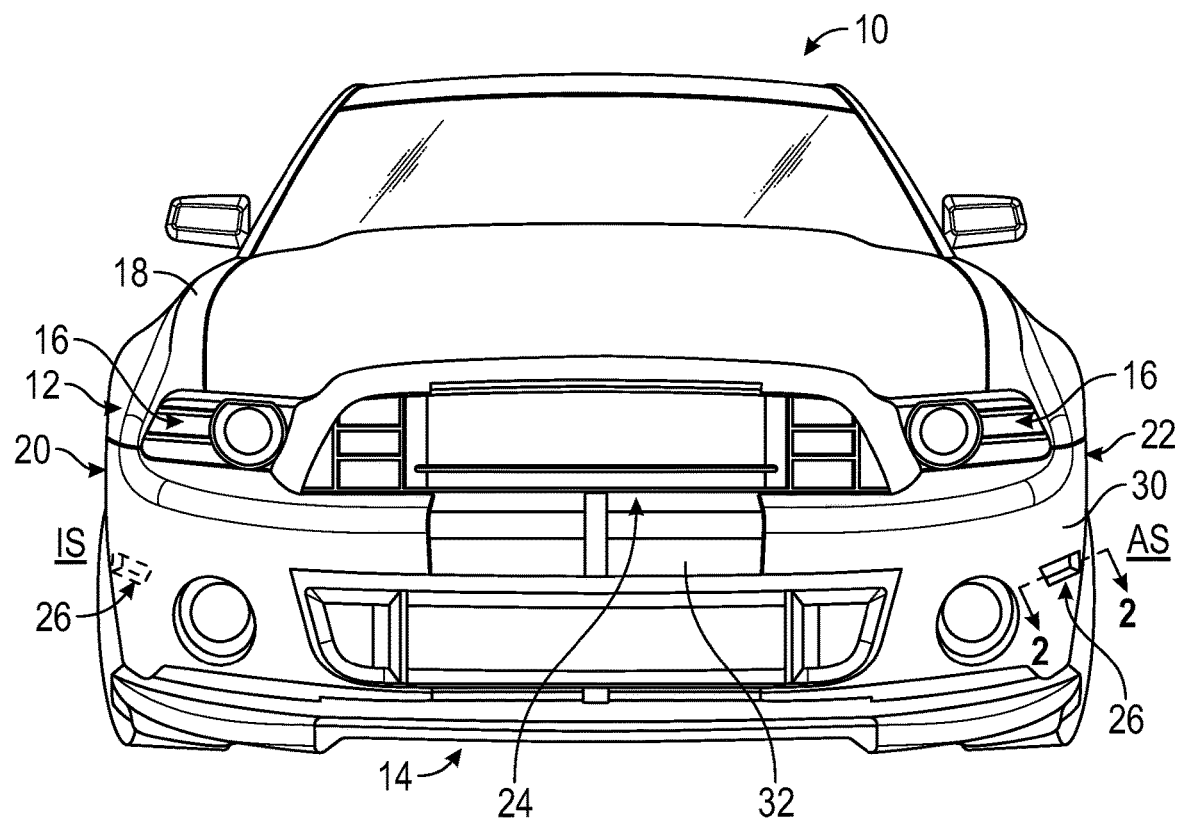
FIG. 1 is a front view of a motor vehicle equipped with multiple lamp assemblies for providing vehicle exterior lighting.

FIG. 1 illustrates select portions of a motor vehicle 10. In the illustrated embodiment, the vehicle 10 is a car. While a car is specifically depicted and referenced herein, other vehicle types, including but not limited to pickup trucks, sport utility vehicles, vans, and crossovers, could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 may be equipped with an exterior lighting system 12 for providing exterior vehicle lighting, for alerting other drivers and/or pedestrians to the vehicle's presence and to the driving intentions of the vehicle 10, etc. As shown in FIG. 1, the exterior lighting system 12 may include various lamps and signaling devices located at or near a front end 14 of the vehicle 10. Although not specifically shown, the vehicle 10 may additionally be equipped with one or more lamps and signaling devices located at or near a rear end of the vehicle 10, and various optional additional lamp assemblies and/or signaling devices located around the perimeter of the vehicle 10. The total number of lamps and signaling devices of the exterior lighting system 12 is not intended to limit this disclosure.

The exterior lighting system 12 of the vehicle 10 may include a pair of head lamp assemblies 16. Each head lamp assembly 16 may be mounted relative to a vehicle static body structure 18 of the vehicle 10 and is positioned to flank outboard sides 20, 22 of a front end assembly 24 of the vehicle 10. The head lamp assemblies 16 may be configured to produce various lighting functions, including but not limited to high and low beam lighting, turn lights, etc.

The exterior lighting system 12 may additionally be include one or more fascia lamp assemblies 26. In an embodiment, two fascia lamp assemblies 26 are provided on the vehicle 10. However, a greater or fewer number of fascia lamp assembles 26 may be provided as part of the exterior lighting system 12 within the scope of this disclosure.

Each fascia lamp assembly 26 may be mounted within a fascia 30 of the vehicle 10. The fascia 30 at least partially conceals a bumper beam 32 of the front end assembly 24 and may be supported by one or more components of the vehicle static body structure 18. The fascia 30 may include a relatively soft flexible plastic structure that can accept paint. The fascia 30 therefore provides a visually pleasing styling element to the vehicle 10. As further discussed below, the fascia lamp assemblies 26 may be configured to produce various lighting functions, including but not limited to, fog lights, parking lights, sidemarker lights, greeting/farewell lighting, etc.

Each fascia lamp assembly 26 may be controlled between an inactive state IS and an active state AS. In the embodiment of FIG. 1, the fascia lamp assembly 26 located on the passenger side of the vehicle 10 is shown in the inactive state IS and the fascia lamp assembly 26 located on the driver side of the vehicle 10 is shown in the active state AS. However, both fascia lamp assemblies 26 could be selectively configured in either state at any given time and depending on various sensed conditions of the vehicle 10. In the inactive state IS, the fascia lamp assembly 26 is substantially concealed/hidden/disguised from view and has the appearance of being an integral part of the fascia 30. In the active state AS, the fascia lamp assembly 26 is revealed within the fascia 30 and is thus visible to onlookers for providing various lighting functions of the exterior lighting system 12. The fascia lamp assemblies 26 of this disclosure are therefore considered to be "revealable" components of the vehicle 10.

Figure 2:
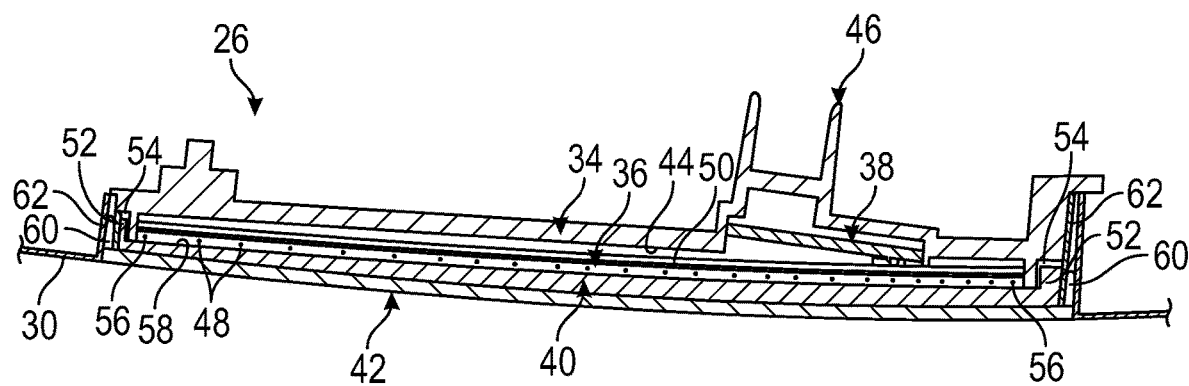
FIG. 2 is a cross-sectional view of a fascia lamp assembly of the motor vehicle of FIG. 1.

FIG. 2 is a cross-sectional view through one of the fascia lamp assemblies 26 of the vehicle 10 of FIG. 1. Other fascia lamp assemblies 26 of the vehicle 10 could include a substantially similar design to that shown in FIG. 2. Each fascia lamp assembly 26 may include a housing 34, a lighting module 36, a power source 38, a conductive inner lens 40, and an outer lens 42.

The housing 34 of the fascia lamp assembly 26 may be made of a thermally conductive plastic material for thermally managing heat generated by the lighting module 36. Various subcomponents of the fascia lamp assembly 26 may be mounted to or otherwise supported relative to the housing 34. The housing 34 may include an electrical connector 46 that is configured for connecting the fascia lamp assembly 26 to a vehicle power supply system.

The lighting module 36 may be supported relative to an inner wall 44 of the housing 34. Although not shown, a thermal adhesive pad may be utilized to secure the lighting module 36 to the inner wall 44 and to facilitate heat transfer therebetween.

The specific configuration of the lighting module 36 is not intended to limit this disclosure, however, in an exemplary embodiment, the lighting module 36 may include a plurality of light sources 48 and a printed circuit board (PCB) 50. Each light source 48 may be a light emitting diode (LED). In an embodiment, each light source 48 is a multi-colored LED, such as a Red, Green, Blue (RGB) LED, for example. Other light sources could also be utilized within the scope of this disclosure. The light sources 48 may be arranged on the PCB 50, such as in a spaced apart relationship. The PCB 50 may include a thin-walled glass-reinforced epoxy laminate panel that is positioned in contact with the thermal adhesive pad (if the pad is provided).

The total number of light sources 48 provided within the lighting module 36 may vary and is a vehicle design dependent parameter. In an embodiment, the lighting module 36 includes a sufficient number of light sources 48 for allowing visualization of the lighting effects emitted therefrom during both daytime conditions and nighttime conditions. The intensity of light emitted from each light source 48 can be varied to provide lighting effects at the proper brightness during both daytime conditions and nighttime conditions.

The power source 38 may be configured to transfer power from the vehicle power supply system to the lighting module 36 and the conductive inner lens 40. In an embodiment, the power source 38 include a microcontroller equipped with a voltage regulator for controlling the voltage output supplied to the lighting module 36 and/or the conductive inner lens 40.

The conductive inner lens 40 may include a pair of legs 52 for mounting the conductive inner lens 40 to the housing 34. In an embodiment, the legs 52 may be received within corresponding grooves 54 of the housing 34.

An electrical charge may be applied from the power source 38 to the conductive inner lens 40 for transitioning the fascia lamp assembly 26 from the inactive state IS to the active state AS. In an embodiment, the electrical charge is applied through conductive contacts 56 that extend from the PCB 50. The conductive contacts 56 may be provided in any amount and may extend into contact with an inner surface 58 of the conductive inner lens 40. Upon receiving the electrical charge, the conductive inner lens 40 charges and may thus convert from a first color to a second color. The first color may be a color that matches the color of the fascia 30 of the vehicle 10, for example, and the second color may be clear, for example. Thus, when the conductive inner lens 40 is converted to clear, the fascia lamp assembly 26 may be revealed within the fascia 30 and then subsequently controlled for producing various desirable lighting functions of the exterior lighting system 12.

In an embodiment, a default state of the fascia lamp assembly 26 is the inactive state IS. Therefore, the styling enhancements provided by the fascia lamp assembly 26 may remain hidden in the fascia 30 until the conductive inner lens 40 is activated via the electrical charge from the power source 38.

In an embodiment, the conductive inner lens 40 is made of a glass-reinforced epoxy laminate material. However, other conductive materials, including but not limited to polydiacetylene polymers, thermochromic polymers, polycarbonates (PC), and polymethyl methacrylates (PMMA), may also be suitable within the scope of this disclosure.

The outer lens 42 may be received relative to the housing 34 such that the outer lens 42 is flush with the fascia 30. In an embodiment, the outer lens 42 is clear and is light transparent. Therefore, in the inactive state IS, the outer lens 42 has an appearance that matches the color of the fascia 30 by virtue of the appearance of the non-charged conductive inner lens 40, and in the active state AS, the outer lens 42 is revealed to onlookers by virtue of the charged conductive inner lens 40 and is configured to permit light from the lighting module to escape to the outside of the fascia lamp assembly 26 for emitting various exterior lighting effects.

The outer lens 42 may include a pair of legs 60 for mounting the outer lens 42 to the housing 34. In an embodiment, the legs 60 may be received within corresponding grooves 62 of the housing 34.

As further discussed below, the outer lens 42 of the fascia lamp assembly 26 may made from materials that are compatible with the material makeup of the fascia 30, which may be made of a thermoplastic polyolefin (TPO), for example. An exemplary TPO includes a polypropylene/high ethylene-octene copolymer. However, other materials may also be suitable for forming the fascia 30.

Figure 3:
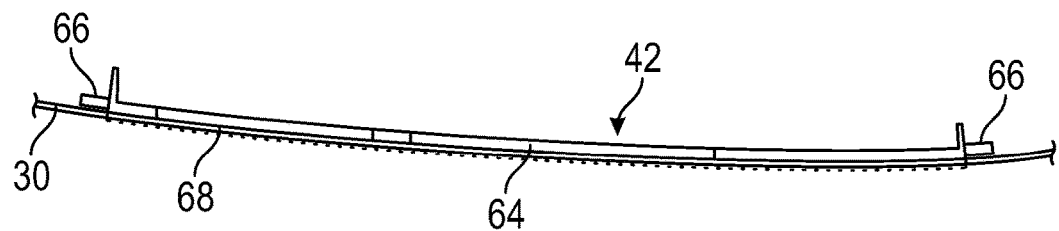
FIG. 3 illustrates an outer lens of the fascia lamp assembly of FIG. 2.

FIG. 3, with continued reference to FIGS. 1-2, illustrates an exemplary outer lens 42 of the fascia lamp assembly 26. The outer lens 42 may include a lens body 64 and an outer rim 66 disposed around a perimeter of the lens body 64. The outer rim 66 facilitates connection of the outer lens 42 to the fascia 30 such that the lens body 64 may be positioned flush to the fascia 30. The outer surface of the outer rim 66 may therefore extend even or level and thus within the same plane as the outer surface of the fascia 30.

The lens body 64 of the outer lens 42 may be made of an acrylic material. An exemplary acrylic material includes polymethyl methacrylate (PMMA). However, other materials may alternatively be utilized to construct the lens body 64 within the scope of this disclosure.

The outer rim 66 of the outer lens 42 may be made of a thermoplastic material. An exemplary thermoplastic material includes thermoplastic polyurethane (TPU). TPU is compatible with both PMMA and TPO and thus facilities a strong bond between the outer lens 42 and the fascia 30.

The outer lens 42 may be molded as part of a two-shot injection molding process. Either a core pull or rotational platen two-shot mold may be used to mold the outer rim 66 to the lens body 64 of the outer lens 42. A first shot of material may provide the lens body 64, and a second shot of material may provide the outer rim 66.

After molding the outer lens 42, a mask 68 may be applied to the front exterior surface of the outer lens 42. The mask 68 is designed to be removed after molding and painting the fascia 30. In an embodiment, the mask 68 is a polymer film with a rubber adhesive. Other materials may also be utilized as part of the mask 68 within the scope of this disclosure.

Once the mask 68 is applied, the outer lens 42 may be inserted into an injection mold. A shot of material may be injected into the mold for forming the fascia 30 around the outer lens 42. The material of the outer rim 66 bonds the material of the lens body 64 to the material of the fascia 30, thereby molding the outer lens 42 to the fascia 30. The mask 68 may be removed from the lens/fascia assembly after processing and painting.

Figure 4:
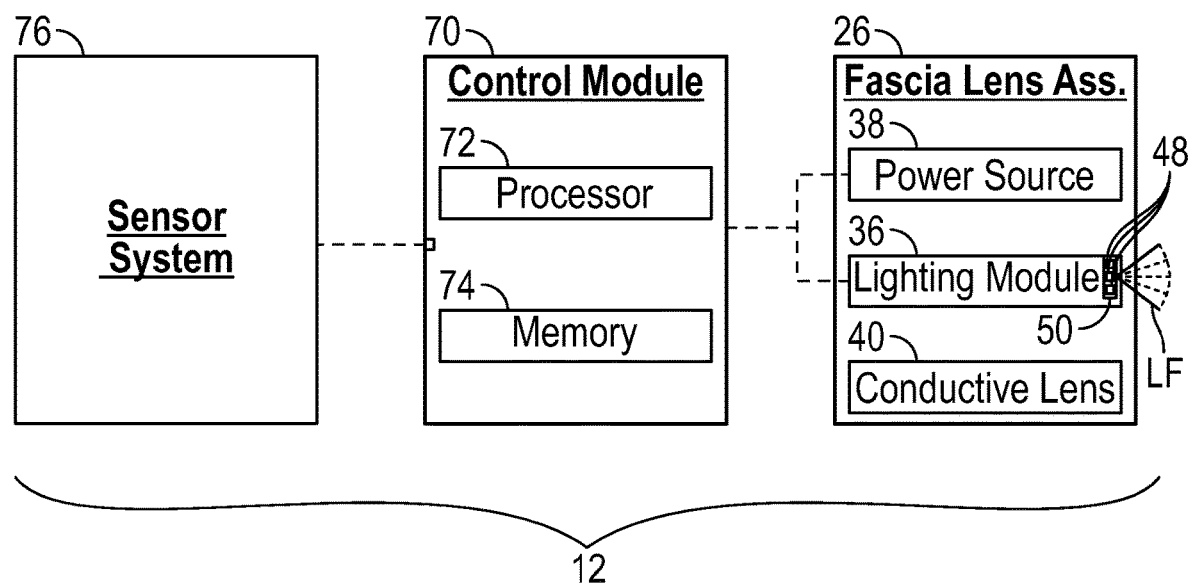
FIG. 4 is a block diagram illustrating exemplary aspects of a vehicle exterior lighting system that includes a fascia lamp assembly.

FIG. 4, with continued reference to FIGS. 1-3, is a block diagram for schematically illustrating the functionality of each fascia lamp assembly 26 of the exterior lighting system 12. Although only one fascia lamp assembly 26 is illustrated in FIG. 4, the exterior lighting system 12 could include multiple fascia lamp assemblies.

The fascia lamp assembly 26 may be transitioned from the inactive state IS to the active state AS for revealing the fascia lamp assembly 26 within the fascia 30 and then controlled for producing various lighting functions LF in response to commands from an illumination control module 70. The illumination control module 70 may be equipped with executable instructions for interfacing with and commanding operation of various components of the exterior lighting system 12, including but not limited to, the lighting module 36 and power source 38 of the fascia lamp assembly 26. The illumination control module 70 may include a processing unit 72 and non-transitory memory 74 for executing the various control strategies and modes of the exterior lighting system 12. The processing unit 72 can be programmed to execute one or more programs stored in the memory 74. The program may be stored in the memory 74 as software code, for example. Each program stored in the memory 74 may include an ordered list of executable instructions for implementing logical functions associated with the fascia lamp assembly 26. The processing unit 72 can be a custom made or commercially available processor, a central processing unit (CPU), or generally any device for executing software instructions. The memory 74 can include any one or combination of volatile memory elements and/or nonvolatile memory elements.

The illumination control module 70 may be programmed, in an embodiment, to transition the fascia lamp assembly 26 from the inactive state IS to the active state AS, or vice versa, in response to receiving signals from a sensor system 76. The sensor system 76 may include various sensors and other vehicle components that are capable of detecting vehicle conditions and communicating with the illumination control module 70 in response to detecting a particular vehicle condition. For example, the sensor system 76 may include vehicle ignition status sensors for detecting whether the vehicle is ON or OFF, object detection sensors (e.g., RADAR sensors, ultrasonic sensors, capacitive sensors, or combinations thereof) for detecting the presence of other vehicles or pedestrians near the vehicle 10, authorization sensors (e.g., Bluetooth low energy transceiver antenna modules (BLEAMs), etc.) for detecting when authorized users are within a threshold distance of the vehicle 10, vehicle drive gear status sensors for indicating a position of a transmission shift device for shifting the vehicle transmission into park (P), reverse (R), neutral (N), drive (D), low (L), etc., and/or various other sensors and components.

In an embodiment, in response to receiving a signal from the sensor system 76 indicating that the vehicle 10 is turned OFF, the illumination control module 70 may communicate a command signal to the power source 38 of the fascia lamp assembly 26. The power source 38 may stop providing the electrical charge to the conductive inner lens 40 in response to receiving the command signal. The conductive inner lens 40 is therefore transitioned to a state in which its color matches the color of the fascia 30, thereby substantially hiding the fascia lamp assembly 26 in the fascia 30 by configuring the fascia lamp assembly 26 in the inactive state IS.

In another embodiment, in response to receiving a signal from the sensor system 76 indicating that an oncoming vehicle is approaching the vehicle 10 when parked, the illumination control module 70 may communicate another command signal to the power source 38 of the fascia lamp assembly 26. The command signal may include instructions for providing the electrical charge to the conductive inner lens 40 and for emitting a desired lighting function from the lighting module 36. For example, the command signal may include instructions for controlling the light sources 48 of the lighting module 36 for emitting light in a specific color, such as red, for alerting the oncoming vehicle of the presence and position of the vehicle 10.

In another embodiment, in response to receiving a signal from the sensor system 76 indicating that the vehicle 10 is operating in a drive gear, the illumination control module 70 may communicate another command signal to the power source 38 of the fascia lamp assembly 26. The command signal may include instructions for providing the electrical charge to the conductive inner lens 40 and for emitting a desired lighting function from the lighting module 36. For example, the command signal may include instructions for controlling the light sources 48 of the lighting module 36 for emitting light in a first color, such as white, when the vehicle 10 is operating above a predefined speed threshold (e.g., about 30 miles per hour), or for emitting light in a second color, such as amber, when the vehicle 10 is operating below the predefined speed threshold. The first color may provide a signature fascia lighting effect, and the second color may provide a sidemarker lighting effect, for example.

In another embodiment, in response to receiving a signal from the sensor system 76 indicating that the vehicle 10 is operating in an autonomous mode, the illumination control module 70 may communicate another command signal to the power source 38 of the fascia lamp assembly 26. The command signal may include instructions for providing the electrical charge to the conductive inner lens 40 and for emitting a desired lighting function from the lighting module 36. For example, the command signal may include instructions for controlling the light sources 48 of the lighting module 36 for emitting light in a specific color, such as aqua, for providing a signature autonomous maker lighting effect.

In yet another embodiment, in response to receiving a signal from the sensor system 76 indicating that the hazard lights of the vehicle 10 have been activated, the illumination control module 70 may communicate another command signal to the power source 38 of the fascia lamp assembly 26. The command signal may include instructions for providing the electrical charge to the conductive inner lens 40 and for commanding the lighting module 36 to emit a desired lighting function. For example, the command signal 84 may include instructions for controlling the light sources 48 of the lighting module 36 for emitting light in a specific color and pattern, such as blinking amber lights, for providing a signature hazard marker lighting effect.

The above lighting functions of the fascia lamp assembly 26 are intended to be exemplary only. The illumination control module 70 may be programmed to command various other lighting functions of the fascia lamp assembly 26 within the scope of this disclosure.

Figure 5:
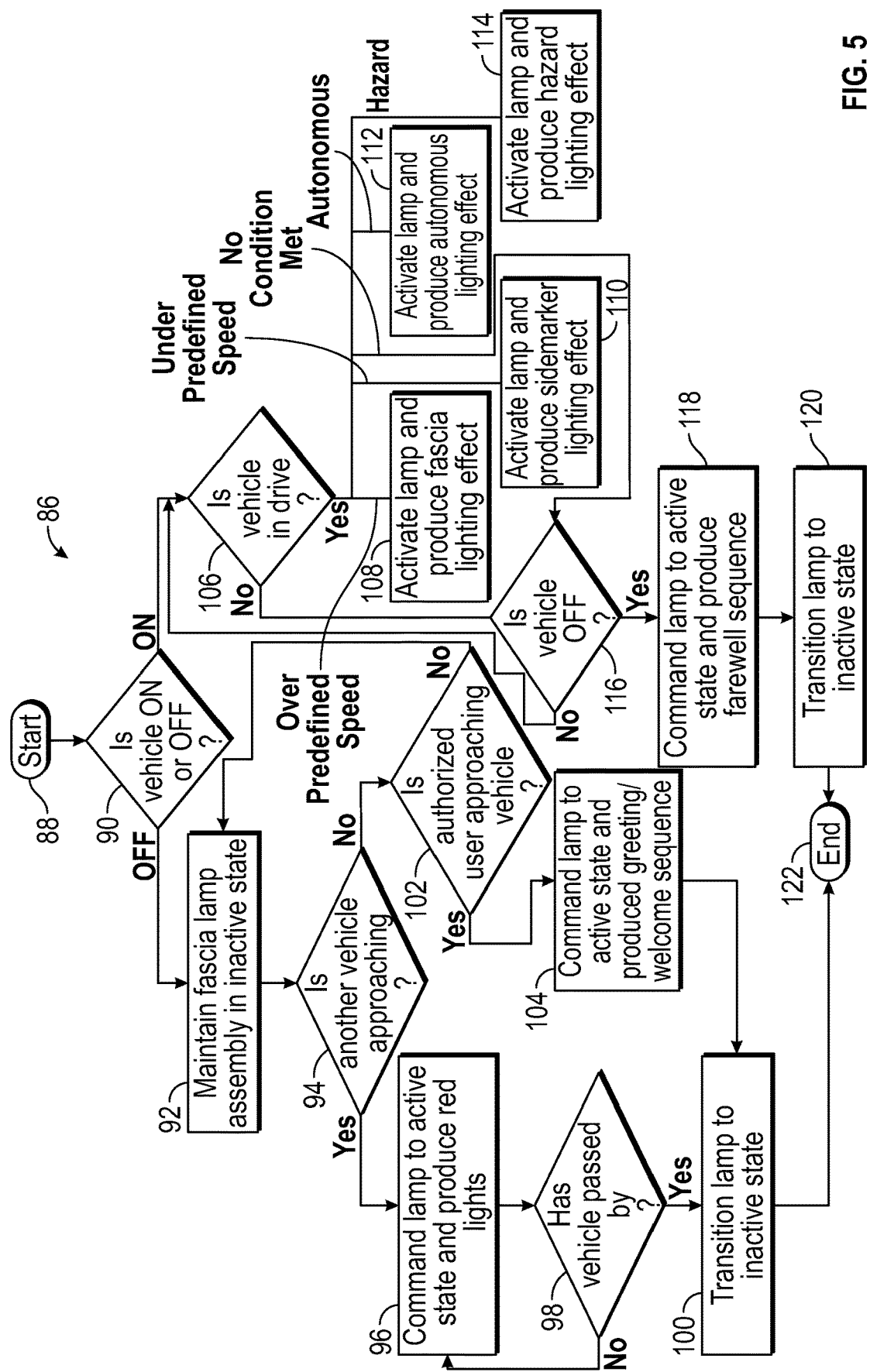
FIG. 5 schematically illustrates an exemplary control strategy for controlling a fascia lamp assembly of a vehicle exterior lighting system.

FIG. 5, with continued reference to FIGS. 1-4, schematically illustrates a method 86 for controlling the exterior lighting system 12 of the vehicle 10 to provide various lighting functions from the fascia lamp assembly 26 during various vehicle conditions. In an embodiment, the illumination control module 70 is programmed with one or more algorithms adapted to execute the exemplary method 86.

The exemplary method 86 may begin at block 88. At block 90, the method 86 may determine whether the vehicle 10 is ON or OFF. In an embodiment, the sensor system 76 may provide ignition status signals to the illumination control module 70 for inferring the vehicle ignition status.

If the vehicle is OFF, the fascia lamp assembly 26 may be maintained in the inactive state at block 92. Next, at block 94, the method 86 may determine whether another vehicle is approaching the vehicle 10. If YES, the illumination control module 70 may command the fascia lamp assembly 26 to the active state AS in order to reveal the fascia lamp assembly 26 within the fascia 30 and may then further command the lighting module 36 to emit red lights for alerting the oncoming vehicle of the presence and position of the vehicle 10 at block 96. This function may be particularly useful when the vehicle 10 is parked on a relatively dark roadway, for example.

The method 86 may confirm whether the oncoming vehicle has passed the vehicle 10 at block 98. If NO, the lighting functions provided at block 96 are continued. If YES, the fascia lamp assembly 26 may be transitioned to the inactive state at block 100. This deactivation may occur, in an embodiment, after a predefined amount of time (e.g., 30 seconds) has passed since the oncoming vehicle passed by the vehicle 10.

If a NO flag is returned at block 94, the method 86 may instead proceed to block 102. At this step, the method 86 may determine whether an authorized user is approaching the vehicle 10. In an embodiment, the sensor system 76 may provide authorization status signals to the illumination control module 70 for inferring whether an authorized user is approaching the vehicle 10. If an authorized user is detected, the illumination control module 70 may, at block 104, command the fascia lamp assembly 26 to the active state AS in order to reveal the fascia lamp assembly 26 within the fascia 30 and may then further command the lighting module 36 to emit white lights as part of a greeting/welcoming sequence that can be provided as the authorized user approaches the vehicle 10. The greeting/welcoming lighting effect may be continued for a predefined amount of time or until the sensor system 76 indicates that the vehicle 10 has been turned ON. The fascia lamp assembly may then be transitioned back to the inactive state IS.

Alternatively, if the vehicle 10 is determined to be ON at block 90, the method 86 may proceed to block 106 instead of block 92. At this step, the method 86 may determine whether the vehicle 10 is in drive. If the vehicle 10 is in drive and is traveling over a predefined speed threshold, the illumination control module 70 may command the fascia lamp assembly 26 to the active state AS in order to reveal the fascia lamp assembly 26 within the fascia 30 and may then further command the lighting module 36 to emit white lights as part of providing a signature fascia lighting effect at block 108.

Alternatively, if the vehicle 10 is in drive and is traveling under the predefined speed threshold, the illumination control module 70 may command the fascia lamp assembly 26 to the active state AS in order to reveal the fascia lamp assembly 26 within the fascia 30 and may then further command the lighting module 36 to emit amber lights as part of providing a signature sidemarker lighting effect at block 110.

Alternatively, if the vehicle 10 is in drive and is operating in autonomous mode, the illumination control module 70 may command the fascia lamp assembly 26 to the active state AS in order to reveal the fascia lamp assembly 26 within the fascia 30 and may then further command the lighting module 36 to emit aqua lights as part of providing a signature autonomous lighting effect at block 112.

Alternatively, if the vehicle 10 is in drive and the hazard lights have been activated, the illumination control module 70 may command the fascia lamp assembly 26 to the active state AS in order to reveal the fascia lamp assembly 26 within the fascia 30 and may then further command the lighting module 36 to emit blinking amber lights as part of providing a signature hazard lighting effect at block 114.

If a NO flag is returned at block 104, or if none of the conditions exist for providing the lighting functions schematically illustrated in blocks 108-114, the method 86 may proceed to block 116 by determining whether the vehicle 10 is OFF. If YES, the illumination control module 70 may, at block 118, command the fascia lamp assembly 26 to the active state AS in order to reveal the fascia lamp assembly 26 within the fascia 30 and may then further command the lighting module 36 to emit white lights as part of a farewell sequence. The farewell lighting effects may be continued for a predefined amount of time or until the sensor system 76 indicates that the vehicle 10 has been turned ON.

Next, at block 120, the fascia lamp assembly 26 may be transitioned to the inactive state. The method 86 may then end at block 122.

The vehicle exterior lighting systems of this disclosure incorporate fascia lamp assemblies that may be transitioned between inactive and active states for selectively revealing the lamps within the vehicle fascia. The exemplary fascia lamp assemblies may therefore provide styling enhancements that are hidden in the fascia vehicle color until activation. The fascia lamp assemblies include flush mounted outer lenses that provide aerodynamic advantages over pocket-mounted fascia lamps. Further, the fascia lamp assemblies may be replaced without replacing the entire fascia.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle exterior lighting system, comprising:
   a fascia; and
   a fascia lamp assembly that is revealable within the fascia, wherein the fascia lamp assembly is transitionable between an inactive state in which the fascia lamp assembly is disguised from view within the fascia and an active state in which the fascia lamp assembly is revealed within the fascia.

2. The system as recited in claim 1, wherein the fascia lamp assembly matches a color of the fascia when in the inactive state.

3. The system as recited in claim 1, wherein the fascia lamp assembly includes a power source and a conductive inner lens, and further wherein the power source is configured to apply an electrical charge to the conductive inner lens for transitioning the fascia lamp assembly from the inactive state to the active state.

4. The system as recited in claim 3, wherein the conductive inner lens is configured to convert from a first color to clear in response to receiving the electrical charge.

5. The system as recited in claim 3, wherein the fascia lamp assembly includes a lighting module that includes a plurality of light emitting diodes (LEDs) that are controllable for providing various lighting effects.

6. The system as recited in claim 3, wherein the fascia lamp assembly includes an outer lens that includes a lens body and an outer rim.

7. The system as recited in claim 6, wherein the outer rim facilitates connection of the outer lens to the fascia such that the lens body is positioned flush to the fascia.

8. The system as recited in claim 1, comprising an illumination control module programmed to control the fascia lamp assembly between the active state and the inactive state in response to receiving signals from a sensor system indicative of a vehicle condition, and further wherein the illumination control module is programmed to command a lighting module of the fascia lamp assembly to provide a specific lighting function adapted for visually indicating the vehicle condition.

9. The system as recited in claim 1, wherein the fascia is a flexible plastic structure that at least partially conceals a vehicle bumper beam, and further wherein the vehicle exterior lighting system includes a head lamp assembly that is separate from the fascia lamp assembly.

10. A vehicle, comprising:
a fascia; and
a fascia lamp assembly that is revealable within the fascia, wherein the fascia lamp assembly includes an outer lens that is positioned flush to the fascia.

11. The vehicle as recited in claim 10, comprising:
a control module programmed to command the fascia lamp assembly between an inactive state and an active state,
wherein, in the inactive state, the fascia lamp assembly is disguised from view within the fascia,
wherein, in the active state, the fascia lamp assembly is revealed within the fascia.

12. The vehicle as recited in claim 11, wherein the control module is further programmed to command that an electrical charge be applied to a conductive inner lens of the fascia lamp assembly for transitioning the fascia lamp assembly from the inactive state to the active state.

13. The vehicle as recited in claim 12, wherein the conductive inner lens is configured to convert from a first color to a second color in response to receiving the electrical charge.

14. The vehicle as recited in claim 13, wherein the first color matches a color of the fascia and the second color is clear.

15. The vehicle as recited in claim 12, wherein the control module is further programmed to command a lighting module of the fascia lamp assembly to provide a specific lighting function adapted for visually indicating a sensed vehicle condition.

16. The vehicle as recited in claim 15, wherein the lighting function includes at least one of a parking light effect, a sidemarker lighting effect, an autonomous lighting effect, a hazard marker lighting effect, a greeting lighting effect, or a farewell lighting effect.

17. The vehicle as recited in claim 10, wherein the outer lens is a two-shot molded outer lens that includes a lens body and an outer rim, and further wherein the outer rim facilitates connection of the outer lens to the fascia such that the lens body is positioned flush to the fascia.

18. The vehicle as recited in claim 17, wherein the fascia is comprised of a thermoplastic polyolefin (TPO), the lens body is comprised of an acrylic material, and the outer rim is comprised of a thermoplastic polyurethane (TPU).

19. The vehicle as recited in claim 10, wherein the fascia at least partially conceals a bumper beam of a front end assembly of the vehicle.

20. A vehicle, comprising:
a static body structure;
a head lamp assembly mounted relative to the static body structure;
a fascia supported by the static body structure and made of a first material;
a fascia lamp assembly that is revealable within the fascia, wherein the fascia lamp assembly is transitionable between an inactive state in which the fascia lamp assembly is disguised from view within the fascia and an active state in which the fascia lamp assembly is revealed within the fascia,
wherein the fascia lamp assembly includes an outer lens that is positioned flush to the fascia, and
wherein the outer lens includes a lens body made of a second material and an outer rim made of a third material, wherein the third material is more compatible with the first material than the second material for facilitating connection of the outer lens to the fascia.

* * * * *